G. M. ROCKWELL.

DRESS FORM OR STAND.

No. 10,334. Reissued May 29, 1883.

Attest:
Philip F. Larner.
Hodell Barth

Inventor:
George M. Rockwell.
By Mrs. Mord
Attorney.

N. PETERS, Photo-Lithographer, Washington, D. C.

UNITED STATES PATENT OFFICE.

GEORGE M. ROCKWELL, OF WOONSOCKET, RHODE ISLAND.

DRESS FORM OR STAND.

SPECIFICATION forming part of Reissued Letters Patent No. 10,334, dated May 29, 1883.

Original No. 272,479, dated February 20, 1883. Application for reissue filed March 23, 1883.

*To all whom it may concern:*

Be it known that I, GEORGE M. ROCKWELL, of Woonsocket, in the county of Providence and State of Rhode Island, have invented certain new and useful Improvements in Dress Forms or Stands for use in Dress-Making, &c.; and I do hereby declare that the following specification, taken in connection with the drawings furnished and forming a part of the same, is a clear, true, and complete description of the several features of my invention.

The objects of my said improvements are to provide a cheap, compact, adjustable, and effective device which will serve the purpose of the usually expensive and cumbersome lay-figures now employed in connection with the making of dress-skirts and other flowing or draped articles of dress not requiring a lay-figure having a bust and shoulders.

After a detailed description of one of my dress-stands the features deemed novel will be specified in the several claims hereunto annexed.

Figure 1:
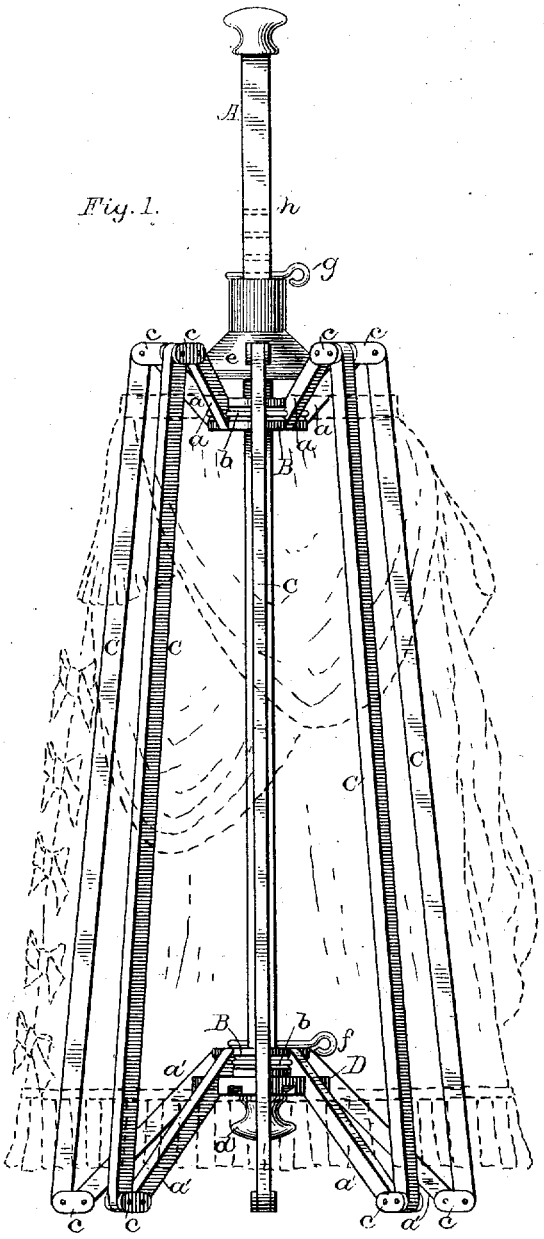
Figure 2:
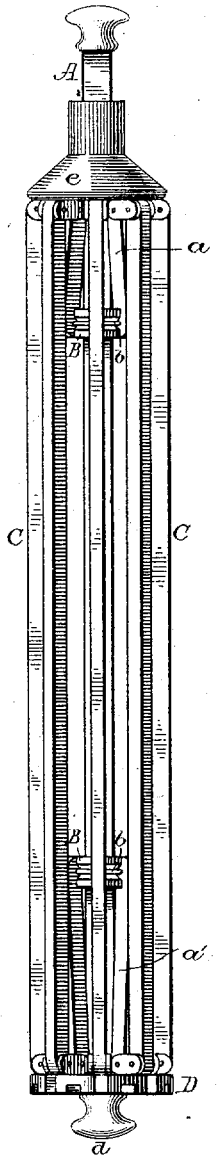
Figure 3:
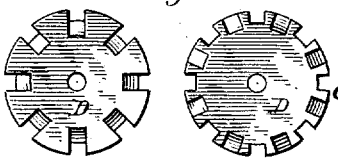

Referring to the drawings, Figure 1 is a side view of one of my novel stands arranged for use, with a dress-skirt thereon, indicated in dotted lines. Fig. 2 illustrates said stand in side view when in its folded or compact condition, as when out of use. Fig. 3 is a top and a bottom view of a detached adjusting-plate.

In my dress-stand I employ a central sliding rod or spine, A, preferably composed of wood and square in cross-section. Upon said spine are two radially-slotted disks, B, preferably composed of wood, and arranged to slide upon said spine without rotation. To each of said disks B there is jointed an annular series of radial arms. The upper disk, B, is provided with short arms *a*, and the lower disk with longer arms *a'*, and said arms are flexibly secured to their respective disks by a pivot-wire, *b*, preferably after the well-known manner of connecting bows and braces to the slides and rings of umbrellas. An annular series of vertical bars, C, are each pivoted to an upper and a lower arm, *a* and *a'*, and these bars not only serve as supports for a skirt, but they also serve as the legs of the stand. For cheaply obtaining very flexible and durable joints between said arms and bars, I employ one or two sheet-metal links, *c*, and suitable rivets, as clearly indicated, thus providing for the expansion of the series of bars, and their contraction for folding them into a compact cylindrical condition closely adjacent to and parallel with the sliding spine A. For setting said vertical bars in their expanded position, I employ at the lower end of the spine, and below the adjacent disk B, an adjusting-plate, D, having radial slots inclined at their inner ends for the reception of the several arms *a'*. This adjusting-plate is rigidly connected to the spine, and has two series of said slots or recesses—one set on each side thereof—the slots on one side being deeper than those on the other, so that by turning the plate over either adjustment can be provided for. The spine at its lower end has a screw knob or cap, *d*, which, when removed, enables the adjusting-plate to be readily taken from the spine and replaced in a reverse position.

For locking the bars C in their expanded condition, I prefer to employ a pin, *f*, inserted in a transverse hole in the spine A, adjacent to the lower disk, B, as shown, and also a sliding annular block, *e*, on said spine, which engages with the arms *a*, and is prevented from sliding on the spine by means of a transverse pin, *g*, placed in some one of the several holes *h* in said spine, as indicated in the drawings, thus enabling the block *e* to cause more or less expansion of the upper ends of the bars C, according to the particular hole which may be occupied by said pin. In lieu of the pins, various forms of spring-latches may be employed—as, for instance, like those used in umbrellas; or a simple thumb-latch and spring may be obviously used for engaging with serrations or teeth provided therefor on one side of the spine.

It will be seen that when expanded for use the spine is elevated, and that the lower ends of the bars C, serving as legs to the stand, will rest evenly upon a floor or carpet, thus obviating any necessity for and the expense of a special standard, as is requisite for lay-figures; and when the stand is folded it will be seen that the spine, with the adjusting-plate D attached thereto, by being moved longitudinally, places said plate beyond the lower ends of the bars C, and thereby admits of the desired compactness of the stand when not in use.

It will also be seen that the upper ends of the bars C may be set or adjusted to any desired diameter, thus enabling it to snugly receive the waistband of a dress-skirt and permit the convenient arrangement of seams, overskirts, drapery, trimmings, &c.

The dress-stand, as shown, is very cheaply constructed, and can be afforded at such low cost as to place it practically within the reach of many people from whom skeletonized lay-figures, by their comparatively great cost, are practically excluded. When out of use my stand is light, readily handled, and occupies as little space for storage as can practically be provided for.

While I prefer to employ some kind of adjusting and locking devices in connection with the bars C, it is obvious that said bars, the spine, the disks B, and the arms pivoted thereto and to the bars C can be successfully employed together without locking or adjusting devices, especially if the pivoted joints are wholly or in part made quite snug or tight, so that they would ordinarily retain any position into which they might be placed.

Having thus described my invention, I claim as new and desire to secure by Letters Patent—

1. The dress form or stand embodying, in combination, the central sliding spine, and the annular series of vertical bars flexibly connected to said spine and serving as legs to the stand, substantially as described.

2. In a dress form or stand, the combination of a central spine adapted to slide, the adjusting-plate connected therewith, the series of vertical bars serving as legs to the stand, and the arms and disks for flexibly connecting the spine and bars, substantially as described.

3. In a dress form or stand, the combination of the spine adapted to slide, the vertical bars serving as legs for the stand, the arms, and the disks adapted to slide on said spine and pivoted to said arms, and provided with devices for locking the disks against movement on said spine, substantially as described.

4. In a dress form or stand, the combination of the spine, the vertical bars serving as legs for the stand, the upper and lower series of radial arms, the disks pivoted to said arms and adapted to slide on the spine, and the block adapted to slide on said spine for varying the expansion of the upper ends of the vertical bars, substantially as described.

5. The combination of the spine, the disks, the radial arms pivoted to said disks, the vertical bars, and the pivoted links for flexibly connecting the arms and bars, substantially as described.

6. The combination, with the spine, the radial arms, and vertical bars, of the reversible adjusting-plate provided with radial recesses for the reception of the radial arms, substantially as described.

GEORGE M. ROCKWELL.

Witnesses:

HENRY N. WALES,

W. R. STETSON.